United States Patent Office 3,497,525
Patented Feb. 24, 1970

3,497,525
2-FURYLBENZIMIDAZOLYL COMPOUNDS
Horst Harnisch, Cologne-Buchheim, and Roderich Raue, Leverkusen-Wiesdorf, Germany, assignors to Farbenfabriken Bayer Aktiengesellschaft, Leverkusen, Germany, a corporation of Germany
No Drawing. Filed Jan. 4, 1967, Ser. No. 607,158
Claims priority, application Germany, Jan. 14, 1966, F 48,168
Int. Cl. C07d *49/38, 5/16*
U.S. Cl. 260—309.2                                9 Claims

ABSTRACT OF THE DISCLOSURE 2-arylbenzimidazolium 5-aryl furan compounds and their quaternary salts having utility as brightening agents.

---

The present invention relates to brightening agents; more particularly it concerns brightening agents which consist essentially of fluorescent, practically colourless benzimidazole compounds of the formula

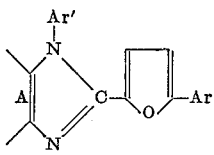

I or the quaternization products thereof corresponding to the formula

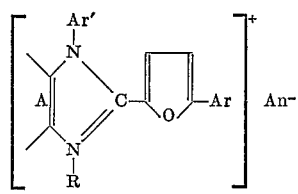

II wherein A stands for the residual members of an aromatic ring system fused with the heterocyclic ring in the manner indicated; Ar and Ar' stand for aromatic radicals; while R stands for an alkyl, alkenyl, cycloalkyl or aralkyl radical which may be substituted, e.g. by halogen or alkoxy; and An⁻ is an anion.

The aromatic and heterocyclic rings contained in the above Formulae I and II may contain various substituents, excepting the nitro group; included, for example, are alkyl, cycloalkyl, aralkyl or aryl radicals, halogen and especially chlorine; cyano, hydroxyl, alkoxy, aralkoxy or aryloxy groups; sulpho groups; carboxyl groups which may be esterified; carboamide or sulphinamide groups which may be substituted by alkyl, aralkyl or aryl radicals; alkylsulphonyl or arylsulphonyl groups; acyloxy or carbamyloxy groups; and the radicals —NHCO-alkyl; —NHCO-aryl; —NHCONH-alkyl; —NHCONH-aryl; —NHY or NZ wherein Y denotes a heterocyclic radical such as the 1,3,5-triazinyl radical and Z stands for the residual members of a heterocyclic ring such as for example

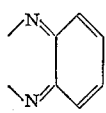

The benzimidazole compounds of the above Formulae I and II are suitable for brightening natural fibre materials of wool and cellulose, compounds which contain sulpho groups being particularly suitable for this purpose, but especially for brightening fibres, foils, films or masses of synthetic origin, for example, those made of cellulose esters, polyamides, polyurethanes, polyesters, polyvinyl chloride, polyvinyl acetate and polystyrene and, in particular, for brightening shaped articles made of polymers containing acrylonitrile.

The benzimidazole compounds of the Formula I to be used as brightening agents can be obtained by various methods. One of these methods consists in that furan-2-carboxylic acids which carry an optionally substituted aryl radical in the 5-position, or their functional derivatives, for example, their esters or acid chlorides, are condensed, if desired, in the presence of inert organic solvents, such as dichlorobenzene, trichlorobenzene, xylene, p-cymol, dimethyl formamide, propylene glycol, ethylene glycol monomethyl ether or diethylene glycol diethyl ether, with optionally substitued compounds of the formula

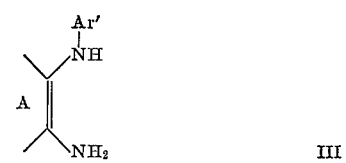

III in which A and Ar' have the same meaning as above, at temperatures between 90° and 260° C., advantageously in the presence of catalysts, e.g. boric acid, zinc chloride, polyphosphoric acid and p-toluene-sulphonic acid.

Examples of furan-2-carboxylic acids are:

5-phenyl-furan-2-carboxylic acid,
5(4'-chlorophenyl)-furan-2-carboxylic acid,
5(4'-bromophenyl)-furan-2-carboxylic acid,
5(2',4'-dichlorophenyl)-furan-2-carboxylic acid,
5(3',4'-dichlorophenyl)-furan-2-carboxylic acid,
5(4'-methylphenyl)-furan-2-carboxylic acid,
5(4'-ethylphenyl)-furan-2-carboxylic acid,
5(4'-methoxyphenyl)-furan-2-carboxylic acid,
5(4'-acetoxyphenyl)-furan-2-carboxylic acid,
5(4'-diphenylyl)-furan-2-carboxylic acid,
5(3'-cyanophenyl)-furan-2-carboxylic acid,
5(4'-cyanophenyl)-furan-2-carboxylic acid,
5(4'-methylsulphonylphenyl)-furan-2-carboxylic acid, and
5(4'-acetaminophenyl)-furan-2-carboxylic acid.

The 5-aryl-furan-2-carboxylic acids can be obtained by reacting diazotised arylamines with furan-2-carboxylic acids in the presence of copper (II) chloride according to C.A. 48, 1935 (1954).

Examples of compounds of the Formula III are:

2-amino-diphenylamine,
3-chloro-2-amino-diphenylamine,
4-chloro-2-amino-diphenylamine,
5-chloro-2-amino-diphenylamine,
5-fluoro-2-amino-diphenylamine,
3'-chloro-2-amino-diphenylamine,
4'-chloro-2-amino-diphenylamine,
4'-bromo-2-amino-diphenylamine,
4,3'-dichloro-2-amino-diphenylamine,
4,4'-dichloro-2-amino-diphenylamine,
4,5'-dichloro-2-amino-diphenylamine,
4-methyl-2-amino-diphenylamine,
5-chloro-3'-methyl-2-amino-diphenylamine,
4-methoxy-2-amino-diphenylamine,
4'-methoxy-2-amino-diphenylamine,
4'-sec. butoxy-2-amino-diphenylamine,
4-cyano-2-amino-diphenylamine,
4-cyano-4'-methyl-2-amino-diphenylamine,
4-cyano-4'-chloro-2-amino-diphenylamine,
4'-cyano-2-amino-diphenylamine, and
4-trifluoromethyl-sulphonyl-2-amino-diphenylamine.

The compounds of the Formula III can be obtained in known manner by reacting optionally substituted 2-nitrochlorobenzene with optionally substituted aniline, followed by reduction of the nitro group.

Another method of producing the benzimidazole compounds of the Formula I consists in that furan-2-aldehydes which carry an optionally substituted aryl radical in the 5-position, are condensed with compounds of the Formula III to give azomethines of the formula

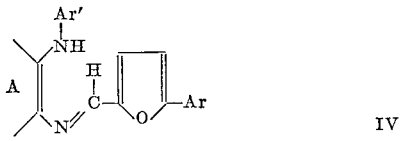    IV in which A, Ar and Ar' have the same meaning as above, and the latter then converted into compounds of the Formula I.

Examples of furan-2-aldehydes are:

5-phenyl-furan-2-aldehyde,
5(4'-chlorophenyl)-furan-2-aldehyde,
5(4'-bromophenyl)-furan-2-aldehyde,
5(2',4'-dichlorophenyl)-furan-2-aldehyde,
5(3',4'-dichlorophenyl)-furan-2-aldehyde,
5(4'-methylphenyl)-furan-2-aldehyde,
5(4'-ethylphenyl)-furan-2-aldehyde,
5(4'-methoxyphenyl)-furan-2-aldehyde,
5(4'-acetoxyphenyl)-furan-2-aldehyde,
5(4'-diphenylyl)-furan-2-aldehyde,
5(3'-cyanophenyl)-furan-2-aldehyde,
5(4'-cyanophenyl)-furan-2-aldehyde,
5(4'-methylsulphonylphenyl)-furan-2-aldehyde,
5(4'-carboxyphenyl)-furan-2-aldehyde,
5(4'-carbomethoxyphenyl)-furan-2-aldehyde,
5(4'-carbethoxyphenyl)-furan-2-aldehyde,
5(4'-carbamoylphenyl)-furan-2-aldehyde,
5(4'-acetaminophenyl)-furan-2-aldehyde, and
5(4'-aminosulphonylphenyl)-furan-2-aldehyde.

The 5-aryl furan-2-aldehydes can be obtained by reacting diazotised arylamines with furan-2-aldehyde in the presence of copper (II) chloride according to C.A. 48, 1935 (1954); alkoxyphenyl- and acylaminophenyl-furan-2-aldehydes can be prepared by known methods from the corresponding nitro compounds.

Compounds of the Formula III which can be used are those which have been mentioned above as being suitable for the reaction with 5-aryl-furan-2-carboxylic acids, and also compounds such as 2-amino-diphenylamine-4-carboxylic acid, 2-amino-diphenylamine-4-carboxylic acid ethyl ester or 4'-methyl-2-amino-diphenylamine-4-carboxylic acid ethyl ester.

Condensation of the 5-aryl-furan-2-aldehydes with the compounds of the Formula III to form azomethines of the Formula IV is expediently carried out at a temperature between 15 and 200° C., preferably at 20–80° C.; it is generally advisable to perform the condensation in a solvent or diluent, such as methanol, ethanol, acetone, acetonitrile, glacial acetic acid, ethyl acetate, dioxan, tetrahydrofuran, dimethyl formamide, benzene, toluene, xylene, chlorobenzene, o-dichlorobenzene, chloroform or carbon tetrachloride.

The azomethines of the Formula IV are converted into the corresponding benzimidazole compounds of the Formula I according to known methods by means of oxidising agents, for example, oxygen, manganese dioxide, copper (II) acetate, lead tetraacetate, sodium hypochlorite, chloranil or nitrobenzene, optionally in a solvent which is inert towards the oxidising agent concerned, such as methanol, ethanol, acetone, glacial acetic acid, dioxan, tetrahydrofuran, dimethyl formamide, benzene, toluene, xylene, chlorobenzene, o-dichlorobenzene, chloroform, carbon tetrachloride and pyridine.

The compounds of the aforesaid Formula II are obtained by treating compounds of the Formula I with quaternising agents, e.g. with dimethyl sulphate, diethyl sulphate, methyl iodide, ethyl chloride, butyl bromide, allyl bromide, benzyl chloride, 4-methoxybenzyl chloride, 4-chlorobenzyl chloride, p-toluene-sulphonic acid methyl ester and p-toluene-sulphonic acid ethyl ester, expediently in the presence of inert organic solvents, such as ethyl acetate, acetone, dioxan, tetrahydrofuran, chloroform, chlorobenzene and toluene, preferably at temperatures between 35 and 120° C.

Compounds of the Formula I or II can be produced from 5-aryl-furan-2-aldehydes and suitable compounds of the Formula III even in the case where one component or both components carry a nitro group, provided that the nitro groups are reduced in the resultant benzimidazole compounds or their quaternisation products to form amino groups; it is recommended subsequently to acylate the amino groups or to convert them into a heterocyclic ring of the formula

As examples of 5-aryl-furan-2-aldehydes containing nitro groups and of 2-aminodiphenylamine compounds containing nitro groups there may be mentioned in this context:

5(4'-nitrophenyl)-furan-2-aldehyde,
4-nitro-2-amino-diphenylamine,
4'-nitro-2-amino-diphenylamine,
4-nitro-3-methyl-2-amino-diphenylamine,
4-nitro-4'-methyl-2-amino-diphenylamine,
4-nitro-3'-chloro-2-amino-diphenylamine, and
4-nitro-4'-chloro-2-amino-diphenylamine.

The optical brightening agents of the present invention can be applied in the usual manner, for example, in the form of solutions in water or organic solvents or in the form of aqueous dispersions; suitable dispersing agents are, inter alia, condensation products of naphthalene-sulphonic acids and formaldehyde, polyglycol ethers of fatty alcohols, fatty amines or alkylated phenols, and cellulose sulphite waste liquor. The brightening agents can also be used together with detergents. They can moreover be used together with finishing agents or they can be added to baths serving for achieving a crease-proof finish. The agents can also be added to spinning and casting solutions, which serve for the production of synthetic fibres, filaments, foils and other shaped articles.

The brightening agents of the present invention give very good yields; they are also fast to light and fast to bleaching baths containing chlorite. The benzimidazole compounds hitherto proposed as brightening agents do not have these advantageous properties to the same extent.

The following examples serve to illustrate the invention without, however, limiting its scope; the parts given are parts by weight, their ratio to the parts by volume being that of kilograms to litres.

EXAMPLE 1

Cellulose acetate fibres are moved about in a liquor ratio of 1:30 at 70° C. for 30 minutes in an aqueous bath containing, per litre, 1 g. of a commercial paraffin sulphonate and 0.1 g. 2(1'-phenyl-benzimidazolyl-(2'))-5(4'-carbethoxyphenyl)-furan as brightening agent. The cellulose acetate fibres are subsequently rinsed and dried. They then exhibit a very good brightening effect.

The brightening agent was prepared in the following manner:

24.4 parts 5(4' - carbethoxyphenyl)-furan-2-aldehyde (melting point 113–115° C.) and 18.4 parts 2-amino-diphenyl amine in 100 parts by volume of alcohol were heated to boiling temperature with reflux cooling for 15 minutes. 70 parts by volume nitrobenzene were subsequently added. The alcohol was then distilled off and the temperature raised to the boiling point of the nitrobenzene. The mixture was kept at the same temperature for 4 minutes while about 5–10 parts by volume of liquid were distilled off. After cooling to room temperature, 50 parts by volume ethyl acetate were added. The mixture was then saturated with dry hydrogen chloride while stirring. The resultant crystalline precipitate was filtered off, washed with ethyl acetate and dried in a vacuum at 60° C. The hydrochloride obtained (36 parts) which had a melting point of 234–236° C., was suspended in 150 parts of water, mixed with 50 parts by volume of a 10% ammonia solution while stirring, and stirring was continued for a further 30 minutes. The crystalline precipitate was then filtered off and washed with water. After squeezing sharply, the crystalline product was recrystallised from formamide/alcohol (2:1), washed with methanol and dried at 60° C. in a vacuum. 23 parts 2(1'-phenyl-benzimidazolyl-(2'))-5(4'-carbethoxyphenyl)-furan of melting point 148–149° C. were obtained.

Very good brightening effects are also achieved by using, instead of the brightening agent mentioned above, 2(1'-phenyl-benzimidazolyl-(2')) - 5(4'-methylsulphonylphenyl)-furan of melting point 229–230° C., which was prepared in an analogous manner from 5(4'-methylsulphonylphenyl)-furan-2-aldehyde (melting point 143–145° C.) and 2-amino-diphenylamine.

EXAMPLE 2

Polyester fibres produced from terephthalic acid and glycol are introduced in a liquor ratio of 1:40 into an aqueous bath containing, per litre, 1 g. sodium oleylsulphate and 0.075 g. 2(1'-phenyl-benzimidazolyl-(2'))-5(4'-carbomethoxyphenyl)-furan as brightening agent. The bath is then heated in a closed vessel at 120° C. for 30 minutes. After rinsing and drying, the polyester fibres exhibit a very good brightening effect.

The brightening agent was prepared by reacting 23 parts 5(4'-carbomethoxyphenyl)-furan - 2 - aldehyde (melting point 148–150° C.) with 18.4 parts 2-amino-diphenylamine in the same manner as described in Example 1 for 5(4'-carbethoxyphenyl)-furan-2-aldehyde; after recrystallisation from dimethyl formamide/alcohol, 22 parts 2(1'-phenyl - benzimidazolyl - (2'))-5(4'-carbomethoxyphenyl)-furan of melting point 188–189° C. were obtained.

Very good brightening effects are also achieved by using, instead of the brightening agent mentioned above, one of the brightening agents mentioned in Example 1.

Cellulose triacetate fibres are introduced in a liquor ratio of 1:30 into an aqueous bath containing, per litre, 1 g. sodium oleyl-sulphate and, as brightening agent, 0.1 g. 2(1'-phenyl-benzimidazolyl-(2')) - 5(4'-methylsulphonylphenyl)-furan, the preparation of which is described in Example 1. The bath is heated at 90–95° C. for 40 minutes. After rinsing and drying, the fibres are well brightened.

EXAMPLE 4

Polyamide fibres of ε-caprolactam are moved about in a liquor ratio of 1:30 for 30 minutes at 60° C. in an aqueous bath containing, per litre, 1 g. sodium oleyl-sulphate and 0.133 g. 2(1'-phenyl-benzimidazolyl-(2'))-5(4'-acetaminophenyl)-furan as brightening agent. After rinsing and drying, the treated polyamide fibres are well brightened.

The brightening agent used was prepared in the following manner:

21.7 parts 5(4'-nitrophenyl)-furan-2-aldehyde (melting point 207–208° C.) and 18.4 parts 2-amino-diphenylamine were heated in 80 parts by volume of alcohol at boiling temperature with reflux cooling for 15 minutes. The mixture was then allowed to cool. The precipitate formed was filtered off, washed with methanol and dried. The resultant 24 parts azomethine (melting point 209–211° C.) were subsequently heated in 70 parts by volume nitrobenzene at boiling temperature for 3–5 minutes while distilling off about 10 parts by volume of liquid. The crystalline precipitate formed while cooling was filtered off, washed with methanol and dried. 16 parts 2(1'-phenyl-benzimidazolyl-(2'))-5(4'-ntrophenyl)-furan of melting point 218–219° C. were obtained. 6 parts of this compound were then heated in 30 parts by volume glacial acetic acid and 20 parts by volume acetic anhydride at boiling temperature with stirring and reflux cooling and mixed within 15 minutes with 10 parts Ferrum reductum. The mixture was subsequently heated at boiling temperature with stirring and reflux cooling for a hour, and then filtered while hot. The residue was extracted twice by boiling with 25 parts by volume dimethyl formamide and filtered hot. The combined filtrates were stirred with 400 parts of water for 20 minutes; the precipitate formed was filtered off, washed with water and dried in a vacuum at 60° C. There were obtained 5.8 parts 2(1'-phenyl-benzimidazolyl-(2'))-5(4'-acetaminophenyl)-furan which melted at 241–242° C. after recrystallisation from alcohol.

A good brightening effect is also obtained by using, instead of the brightening agent mentioned above, 2(1'-phenyl - benzimidazolyl - (2'))-5(4'-ethylsulphonylphenyl)-furan, the preparation of which is described in Example 1.

EXAMPLE 5

Polyacrylonitrile fibres are introduced in a liquor ratio of 1:40 into an aqueous bath containing, per litre, 1 g. of a commercial interface-active paraffin sulphonate, 0.75 g. formic acid and 0.1 g. 2(1'-phenyl-benzimidazolyl-(2'))-5(4'-chlorophenyl)-furan as brightening agent. The bath is heated to boiling temperature within 20 minutes and kept at the same temperature for 45 minutes. The polyacrylonitrile fibres are subsequently rinsed and dried. They are then excellently brightened.

The brightening agent was prepared in the following manner:

112 parts 5(4'-chlorophenyl)-furan-2-carboxylic acid (melting point 199–201° C.), 94 parts 2-amino-diphenylamine and 3 parts boric acid were first heated under a weak nitrogen current to 200° C. while stirring, and the temperature was raised to 250° C. within 20 minutes. The reaction mixture was further stirred at this temperature for 1 hour, while the water was partially distilled off, then cooled to 170° C. while stirring and mixed with 50 parts by volume dimethyl formamide while stirring. 250 parts by volume methanol were then added at 90° C. After stirring for several hours, first at room temperature, then on an ice-bath, the resultant crystalline precipitate was filtered off, washed with cold methanol and dried at 80° C. in a vacuum. 88 parts 2(1'-phenyl-benzimidazolyl-(2'))-5(4'-chlorophenyl)-furan were obtained (melting point 159–161° C., from dimethyl formamide/alcohol).

EXAMPLE 6

Polyacrylonitrile fibres are introduced in a liquor ratio of 1:40 into an aqueous bath containing, per litre, 1 g. of a commercial interface-active oleyl polyglycol ether, 1 g. oxalic acid, 1 g. sodium chlorite and 0.1 g. of the brightening agent described in Example 5. The bath is heated to boiling temperature within 20 minutes and kept at the same temperature for 1 hour. The polyacrylonitrile fibres are subsequently rinsed and dried. They are then excellently brightened.

Similar brightening effects are achieved by using, instead of the brightening agent described in Example 5, one of the following compounds:

(a) 2(1'-phenyl - benzimidazolyl-(2'))-5(4'-carbethoxyphenyl)-furan of melting point 148–149° C.,
(b) 2(1'-phenyl - benzimidazolyl-(2'))-5(4'-methylsulphonylphenyl)-furan of melting point 229–230° C.,
(c) 2(1'-phenyl - benzimidazolyl-(2'))-5(4'-carbomethoxyphenyl)-furan of melting point 188–189° C.,
(d) 2(1'-phenyl-benzimidazolyl - (2')) - 5(3',4'-dichlorophenyl)-furan of melting point 144–146° C., and
(e) 2(1'-phenyl-benzimidazolyl-(2'))-5(4'-cyanophenyl)-furan of melting point 205–206° C.

The production of the compounds mentioned under (a) (b) and (c) is described in Examples 1 and 2, the compound mentioned under (d) was prepared from 5(3',4'-dichlorophenyl)-furan-2-carboxylic acid (melting point 228–230° C.) and 2-amino-diphenylamine in a manner analogous to that described for the brightening agent of Example 5, and the compound mentioned under (e) was prepared from 5(4'-cyanophenyl)-furan-2-aldehyde and 2-amino-diphenylamine in a manner analogous to that described for the brightening agent of Example 1.

EXAMPLE 7

Polyacrylonitrile fibres are introduced in a liquor ratio of 1:40 into an aqueous bath containing, per litre, 1 g. oxalic acid, 1 g. sodium chlorite and 0.075 g. 5(2',4'-dichlorophenyl)-furan-2-(3'-methyl - 1' - phenyl-benzimidazolium-(2'))-methosulphate as brightening agent. The bath is heated to boiling temperature within 20 minutes and kept at the same temperature for 45 minutes. The polyacrylonitrile fibres are subsequently rinsed and dried. They are then excellently brightened.

The brightening agent used was prepared in the following manner:

96.5 parts 5(2',4'-dichlorophenyl)-furan-2-aldehyde (melting point 162–163° C.) and 73.5 parts 2-amino-diphenylamine were heated in 200 parts by volume of alcohol at boiling temperature with reflux cooling for 20 minutes. 130 parts by volume nitrobenzene were subsequently added. The alcohol was then distilled off and the temperature raised to the boiling point of the nitrobenzene. The mixture was then kept at the same temperature for 3–4 minutes, while distilling off about 10 parts by volume of liquid. After cooling to room temperature, 50 parts by volume ethyl acetate were added, and the reaction mixture was further stirred at room temperature for 10 hours. The resultant precipitate was filtered off with suction, washed with ethyl acetate and dried in a vacuum at 60° C. 76 parts 2(1'-phenyl-benzimidazolyl-(2'))-5(2',4'-dichlorophenyl)-furan were obtained (melting point 162–164° C. from alcohol/toluene). 8 parts of this compound were dissolved at 55° C. in 50 parts by volume chlorobenzene and mixed dropwise with 4 parts by volume dimethyl sulphate. The mixture was further stirred at 60° C. for 45 minutes and then cooled. The resultant crystalline precipitate was filtered off, washed with ethyl acetate and dried at 60° C. in a vacuum. 10.6 parts of the above brightening agent were obtained (melting point 204–206° C. from water).

Excellent brightening effects are also achieved by using, instead of the brightening agent used above, one of the following compounds:

(a) 5(4'-chlorophenyl)-furan - 2(3' - methyl-1'-phenyl-benzimidazolium-(2'))-methosulphate (melting point 233–235° C.),
(b) 5(3',4'-dichlorophenyl) - furan - 2(3' - methyl-1'-phenyl-benzimidazolium-(2'))-methosulphate (melting point 225–228° C.),
(c) 5(2',4'-dichlorophenyl) - furan-2(3'-methyl-1'-(4''-methylphenyl)-benzimidazolium - (2')) - methosulphate (melting point 198–200° C.),
(d) 5(2',4'-dichlorophenyl)-furan - 2(3' - methyl-1'-(4''-chlorophenyl) - benzimidazolium-(2'))-methosulphate melting point 183–185° C.),
(e) 5(2',4'-dichlorophenyl) - furan - 2(3' - methyl-1'-phenyl-(5'-chloro-benzimidazolium - (2')) - methosulphate (melting point 247–249° C.),
(f) 5(4'-chlorophenyl) - furan-2(3'-ethyl - 1' - phenyl-benzimidazolium-(2'))-tosylate (melting point 197–198° C.),
(g) 5(4' - chlorophenyl) - furan-2(3'-(4''-cyanobenzyl)-1'-phenylbenzimidazolium - (2')) - chloride (melting point 237–239° C.),
(h) 5(4' - chlorophenyl) - furan - 2(3'-(4''-chlorobenzyl)-1'-phenyl - benzimidazolium-(2'))-chloride (melting point 221–223° C.).

The quaternary compounds (a) and (b) were prepared by methylation of the corresponding benzimidazole compounds mentioned in Example 6 with dimethyl sulphate in chlorobenzene at 60° C.

The quaternary compound (c) was prepared in the following manner:

24 parts 5(2',4'-dichlorophenyl)-furan - 2 - aldehyde (melting point 162–164° C.) and 20 parts 4'-methyl-2-amino-diphenylamine were heated in 170 parts by volume of tetrahydrofuran at boiling temperature with reflux cooling for 20 minutes. 50 parts by volume nitrobenzene were subsequently added. The tetrahydrofuran was then distilled off and the temperature raised to the boiling point of the tetrahydrofuran. The mixture was kept at the same temperature for 4 minutes, while distilling off about 10 parts by volume of liquid. After cooling to room temperature 30 parts by volume benzene were added, and the reaction mixture was further stirred at room temperature for 5 hours. The resultant precipitate was filtered off with suction, washed with benzene and recrystallized from toluene. 17 parts 2(1'-(4''-methylphenyl) - benzimidazolyl-(2'))-5(2',4'-dichlorophenyl)-furan were obtained (melting point 194–195° C.). 10 parts of this compound were dissolved at 55° C. in 50 parts by volume chlorobenzene, mixed dropwise with 4.5 parts by volume dimethyl sulphate, stirred at 60° C. for 2 hours and then cooled. The resultant crystalline precipitate was filtered off, washed with ethyl acetate and dried at 80° C. in a vacuum. Yield: 11.5 parts.

The quaternary compound (d) was prepared by methylation of the 2(1'-(4''-chlorophenyl)-benzimidazolyl-(2'))-5(2',4'-dichlorophenyl)-furan (melting point 216–218° C.), which was obtained from 5(2',4'-dichlorophenyl)-furan-2-aldehyde and 4'-chloro-2-aminodiphenylamine, with dimethyl sulphate in chlorobenzene at 60° C.

The quaternary compound (e) was prepared by methylation of the 2(1'-phenyl-(5'-chlorobenzimidazolyl)-(2'))-5(2',4'-dichlorophenyl)-furan (melting point 183–185° C.), which was obtained from 5(2',4'-dichlorophenyl)-furan-2-aldehyde and 4-chloro-2-aminodiphenylamine, with dimethyl sulphate in chlorobenzene at 60° C.

The quaternary compound (f) was prepared in the following manner:

3.7 parts of the brightening agent mentioned in Example 5 were stirred with 4 parts of 4-toluenesulphonic acid ethyl ester in 10 parts by volume of chlorobenzene at 90° C. for 10 hours and then cooled. The resultant crystalline precipitate was filtered off, washed with ethyl acetate and dried at 60° C. in a vacuum. Yield: 5.5 parts.

The quaternary compounds (g) and (h) were prepared in the following manner:

3.7 parts of the brightening agent mentioned in Example 5 were heated with 2 parts of 4-cyanobenzyl chloride or 4-chlorobenzyl chloride respectively in 10 parts by volume of chlorobenzene at 130° C. for 15 hours while stirring. The reaction mixture was then cooled and 10 parts by volume of ethyl acetate were added. The resulting crystalline precipitate was filtered off, washed with ethyl acetate and dried at 60° C. in a vacuum. Yield: 2 parts.

EXAMPLE 8

65 parts of a polyvinyl chloride powder prepared by emulsion polymerisation, 35 parts of a commercial dioctyl phthalate as plasticiser, 2 parts of a commercial tin dilaurate as stabiliser and 0.1 part of the 5(4'-chlorophenyl)-furan-2(3'-methyl - 1' - phenyl-benzimidazolium-(2'))-methosulphate mentioned in Example 7 are stirred to form a paste and subsequently rolled on a three-roller calender at 160–170° C. to produce a foil. The foil is then excellently brightened.

Excellent brightening effects are also achieved by using, instead of the above brightening agent one of the following quaternary compounds:

(a) 5(2',4'-dichlorophenyl)-furan-2(3'-methyl-1'-phenylbenzimidazolium-(2'))-methosulphate (melting point 204–206° C.), (b) 5(3′,4′-dichlorophenyl)-furan-2(3′-methyl-1′-phenylbenzimidazolium-(2′))-methosulphate (melting about 225–228° C.), (c) 5(2′,4′-dichlorophenyl)-furan-2(3′-n-butyl-1′-phenylbenzimidazolium-(2′))-bromide (melting point 270–272° C.).

The preparation of the quaternary compounds (a) and (b) is described in Example 7. The quaternary compound (c) was prepared in the following manner:

30 parts 2(1′ - phenyl-benzimidazolyl-(2′))-5(2′,4′-dichlorophenyl)-furan which was obtained as described in Example 7, were heated with 12 parts butyl bromide in 80 parts by volume of chlorobenzene at 180° C. for 8 hours in a closed vessel and then cooled. The resultant crystalline precipitate was filtered off, washed with ethyl acetate and dried at 60° C. in a vacuum. Yield: 18 parts.

EXAMPLE 9

A woolen fabric is moved about in a liquor ratio of 1:40 for 30 minutes at 60° C. in an aqueous bath containing, per litre, 0.75 g. formic acid and 0.13 g. of brightening agent described below. The fabric is subsequently rinsed and dried. It exhibits a marked brightening effect.

The brightening agent used was prepared in the following manner:

8 parts 2(1′-phenyl-benzimidazolyl-(2′))-5(4′-chlorophenyl-furan the preparation of which is described in Example 5, were introduced into 50 parts sulphuric acid monohydrate while cooling and stirring. The mixture was subsequently stirred at room temperature for 1 hour, then mixed dropwise with 8 parts oleum (SO₃ content 65%), stirred at room temperature for a further 3 hours and finally poured on to 300 parts of ice. The reaction mixture was then neutralised with a sodium hydroxide solution. Upon salting out with sodium chloride, the brightening agent separated as a colourless crystalline precipitate. This was filtered off with suction, washed with a dilute sodium chloride solution and dried in a vacuum at 60° C.

We claim:

1. A benzimidazole compound of the formula

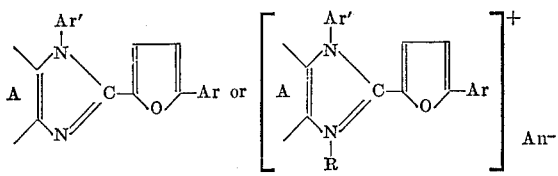

A is 1,2-phenylene or 1,2-phenylene substituted by members selected from the group consisting of chloro, fluoro, lower alkyl, lower alkoxy, cyano, trifluoro methyl sulfonyl, carboxy and carbo lower alkoxy;

R is lower alkyl, benzyl, chlorobenzyl, cyanobenzyl, or allyl;

Ar′ is a member selected from the group consisting of phenyl, chlorophenyl, bromophenyl, lower alkyl phenyl, lower alkoxy phenyl, and cyanophenyl;

Ar is a member selected from the group consisting of a phenyl, chlorophenyl, bromophenyl, dichlorophenyl, alkyl phenyl having 1–2 carbon atoms in the alkyl moiety, methoxyphenyl, acetoxyphenyl, diphenylyl, cyanophenyl, methyl sulfonyl phenyl, amino sulfonyl phenyl, carbamoyl phenyl, acetylamino phenyl, carboxylphenyl, and carbo lower alkoxy phenyl; and An⁻ is an anion acceptable for optical brightening activity.

2. The compound of claim 1 wherein
A is 1,2-phenylene;
Ar′ is phenyl; and
Ar is carbomethoxyphenyl.

3. The compound of claim 1 wherein
A is 1,2-phenylene;
Ar′ is phenyl; and
Ar is carbethoxy phenyl.

4. The compound of claim 1 wherein
A is 1,2-phenylene;
Ar′ is phenyl; and
Ar is cyanophenyl.

5. A compound of claim 1 wherein
A is 1,2-phenylene;
Ar is p-chlorophenyl; and
Ar′ is a phenyl.

6. A compound of claim 1 wherein
A is 1,2-phenylene;
Ar is 2,4-dichlorophenyl; and
Ar′ is a phenyl.

7. A compound of claim 1 wherein
A is 1,2-phenylene;
Ar is p-chlorophenyl;
Ar′ is a phenyl; and
R is lower alkyl or benzyl.

8. A compound of claim 1 wherein
A is 1,2-phenylene;
Ar is 2,4-dichlorophenyl;
Ar′ is a phenyl; and
R is lower alkyl or benzyl.

9. A compound of claim 8 wherein R is methyl.

References Cited

UNITED STATES PATENTS 3,103,518  9/1963  Duennenberger et al. 260—309.2
3,137,578  6/1964  De Selms _____ 260—309.2

OTHER REFERENCES

German printed application No. 1,117,000, November 1961, Meyer. (KL 71a 1/10) 260–309.2 (2 pages).

De Selms II, Jour. Org. Chem., vol. 27, pp. 2163–5 (1962), QD 241. J6.

HENRY R. JILES, Primary Examiner

N. TROUSOF, Assistant Examiner

U.S. Cl. X.R.

117—33.5; 252—8.8; 260—240, 249.5, 347.2, 347.3, 347.4, 347.7, 347.8, 465, 575, 576